F. J. BOWMAN.
DRIER.
APPLICATION FILED FEB. 24, 1914.
1,265,298.
Patented May 7, 1918.
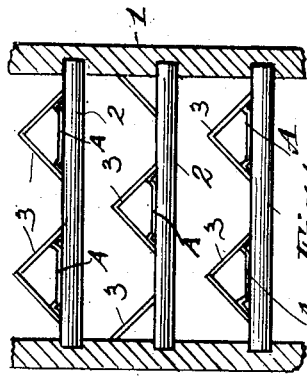
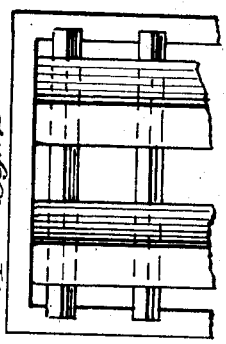
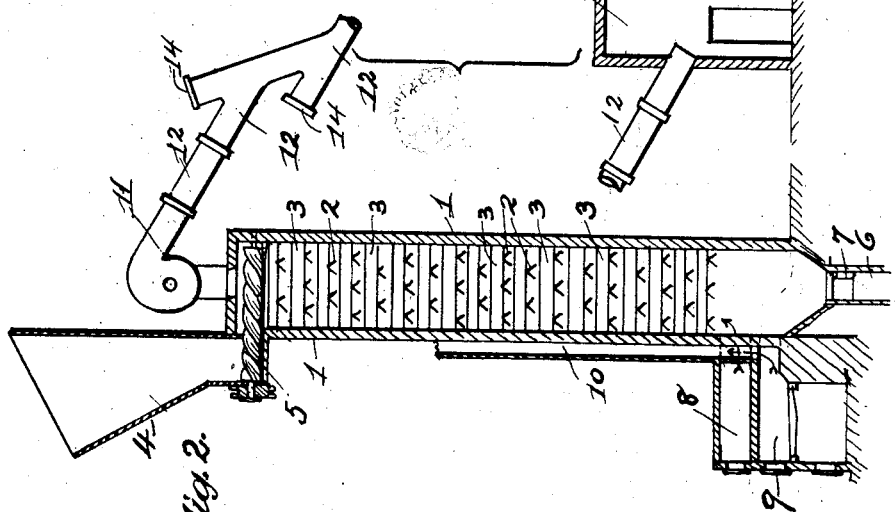
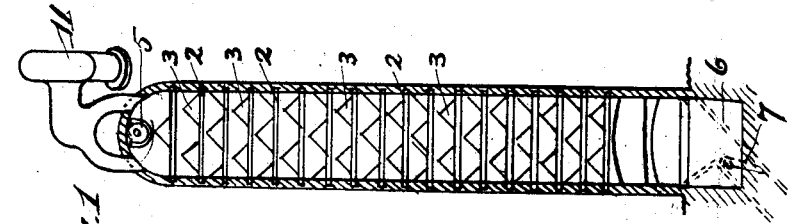
Witnesses
Inventor

UNITED STATES PATENT OFFICE.

FREDERICK JOSEPH BOWMAN, OF CLEVELAND, OHIO.

DRIER.

1,265,298. Specification of Letters Patent. Patented May 7, 1918.

Application filed February 24, 1914. Serial No. 820,410.

*To all whom it may concern:*

Be it known that I, FREDERICK JOSEPH BOWMAN, a citizen of the United States, and resident of Cleveland, in the county of Cuyahoga and State of Ohio, have invented certain new and useful Improvements in Driers, of which I hereby declare the following to be a full, clear, and exact description, such as will enable others skilled in the art to which it appertains to make and use the same.

The objects of the invention are to provide an automatically acting drying machine for such materials as sand, pulverized powdered ores, coal, malt, etc., in which device the finely divided particles of dust which are ordinarily dissipated and lost are deposited in separate compartments where they can be collected and so prevent the waste of a large percentage of the material which in the case of valuable ores provides a most desirable saving.

The invention comprises a vertical tower or enlarged flue upwardly through which heated air passes under an induced draft, and into which the material to be dried falls by gravity. The interior of this tower is provided with receiving devices for arresting the upward current of air, the same devices being so constructed and arranged as to retard and widely distribute the falling material, and to constantly redistribute the same so that it will fall from one receiver to the other, and every particle will be exposed on all sides to the heating influence of the column of hot air rising through said tower and to the contact of the surface of each receiver, thus permitting the moisture to be conveyed away from it by the current of air.

The invention also includes means for collecting the dust which forms at the top of the tower so that it can be recovered and returned to the drier, and passed again through the tower for treatment.

The invention consists in the construction of inclined receiving plates or bars spaced in staggered relation to each other in the tower, in means for producing a rising current of hot air in the tower, and in means for moistening and collecting the fine particles of dust for return to the tower, and further consists in the combination and arrangement of parts and construction of details as hereinafter described, shown in the accompanying drawings and specifically pointed out in the claim.

In the accompanying drawings Figure 1 is a vertical section of the drier; Fig. 2 is a similar section through the drier and dust collecting device; Fig. 3 is an enlarged vertical section of a portion of the drier; and Fig. 4 is a plan view of the same.

In these views 1 is the tower preferably of rectangular shape and 2, 2, are transverse angle bars secured in the wall at their ends as shown in Fig. 3 and arranged therein in staggered relation to each other as shown in Fig. 2, in rows, and spaced from each other.

These rows of bars extend from the top to the bottom of the tower and upon these bars preferably at right angles, are placed angle plates 3, 3 which extend from wall to wall. The half-bars or half-angles which are shown as touching the wall in every other row are inclined away from the wall, in this way preventing any appreciable contact between the material and the wall which might lead to the sticking of the material thereto.

The upper bars are preferably of larger size than the supporting bars therefor and are also arranged in staggered relation to each other.

At the top of the tower is shown a hopper 4 which discharges the moist material into the tower by means of a feed screw 5 where it falls upon the first layer of angled cross bars and by them is distributed to fall in thin sheets upon the next layer of bars below, and in this manner the particles of material are separated from each other by sliding down the inclined surfaces of the bars from the lower edge of one series to the upper edge of the next series below until the material has traversed the entire length of the tower.

The inverted angle plates provide pockets in which the hot air is temporarily retained and which tend to prevent the too rapid circulation of hot air and apply it directly to the thin sheets of material falling over the edges of the plates. The effect of this treatment is to cause a constant redistribution of the particles of the ground material over the plates in thin sheets and a constant passage of the currents of hot air through the thin sheets of material which treatment recurs with every layer of bars, and the staggered relation of the angle plates causes the material to fall from one bar onto the one below and to be redistributed as it passes over the edges of each set or layer of bars, so that by the time the material has arrived at the bottom of the tower all moisture has been extracted therefrom and is carried upward by the column of air which has absorbed it.

The air is preferably heated by means of a muffler 8 placed upon the furnace 9 at one side of the lower end of the flue. The flue which carries away the products of combustion rises at 10 alongside of the tower, but with some products such as sand which will not be injured by contact with the products of combustion, the furnace draft can pass directly through the tower if desired.

The dried material falls through a chute 6 at the lower end of the tower which is controlled by means of the hinged valve 7 which is moved by the material in passing but which automatically closes to prevent cold air from entering from below.

The vertical draft through the tower is accelerated by means of a blower 11 located at the top of the stack and this blower draws out the moistened air including the particles of dust which are too fine to settle by gravity upon the bars. To preserve this dust which in the case of some ores is too valuable to waste, the current of vapor mingled with dust is discharged through downwardly inclined conduit pipes 12, 12, into collecting chambers 13, 13.

The vapor commingled with the dust condenses and the dust absorbs the vapor and is deposited upon the walls of the pipes in the form of soft mud and slides down into the first chamber. After leaving these collecting chambers the current of vapor is conducted through a pipe P into a vertical pipe P' the mouth of which extends slightly below the surface of a tank T containing water, and bubbles to the surface, thus forming a trap which strains out every particle of dust that may remain, and the minutest particle or mote of the material is preserved permitting only the vapor to escape.

The moisture formed by condensation of the vapor assists in washing it out of the conduit. The conduit is preferably constructed of vitrified material having a smooth inner surface adapted to assist in the movement of the moistened masses. The conduit is usually constructed of a series of straight sewer pipe, each having an offset or Y communicating therewith. These Y's are provided with removable covers or heads 14, 14, which permit access to the interior of the pipes in case there should be any stoppage and collection of the material therein and so that the conduit can be cleaned.

Following the first collecting chamber are a series of similar chambers 13, 13, separated by means of baffle walls 15, 15, which become wet by the condensation of the vapor and any dust that has not been deposited in the first compartment will be collected upon the baffle walls and side walls of the chambers.

The walls of these chambers are preferably lined with glazed tile so that the moistened dust will flow downward upon them.

After the collecting chambers are filled or a sufficient amount of moist material is deposited therein, it is removed through doors D, D, D, in the side walls thereof, and is returned to the main flue for drying.

In this manner the most finely powdered ores and other materials can be dried without loss of any of their finest particles, and the vapor escaping from the chambers and tank will be free from all dust and deposit.

In Fig. 3 brace bars A connect the sides of the angles 3.

The device described above has been given a thorough test and has been found to be practical and efficient and the vapor escaping at the end is as free from dust as the exhaust from a steam engine.

Having described the invention what I claim as new and desire to secure by Letters Patent is:

In a drier, in combination, a vertical tower, means for heating the air supplied thereto, series of distributing devices spaced apart in said flue, each series comprising parallel spaced angle plates having the apex of the angles projecting upward, the plates in each series bearing a staggered relation to the plates in adjacent series, some of the series of plates terminating in inclined end plates resting against the walls of said tower, a blower for exhausting the air from said tower, a downwardly extending conduit into which said blower discharges the air from said tower, a settling tank for the fine material discharged from said pipe, and a trap for the air discharged from said tank.

In testimony whereof, I hereunto set my hand this 26th day of January 1914.

FREDERICK JOSEPH BOWMAN.

In presence of—
CHAS. H. OLDS,
WM. M. MONROE.